US012774047B2

(12) United States Patent
Berg et al.

(10) Patent No.: US 12,774,047 B2
(45) Date of Patent: Oct. 27, 2026

(54) CIVILIAN TRACKED VEHICLE

(71) Applicant: Kässbohrer Geländefahrzeug AG, Laupheim (DE)

(72) Inventors: Tobias Berg, Mietingen (DE); Tobias Pfetsch, Blaustein (DE); Markus Schmied, Neu-Ulm (DE); Jochen Kling, Neu-Ulm (DE); Roman Ströbele, Staig (DE)

(73) Assignee: KÄSSBOHRER GELÄNDEFAHRZEUG AG, Laupheim (DE)

(*) Notice: Subject to any disclaimer, the term of this patent is extended or adjusted under 35 U.S.C. 154(b) by 168 days.

(21) Appl. No.: 18/454,296

(22) Filed: Aug. 23, 2023

(65) Prior Publication Data

US 2024/0067281 A1 Feb. 29, 2024

(30) Foreign Application Priority Data

Aug. 30, 2022 (DE) ......................... 102022208965.0

(51) Int. Cl.
*B62D 55/06* (2006.01)
*B62D 11/00* (2006.01)
*G05G 9/047* (2006.01)

(52) U.S. Cl.
CPC ............ *B62D 55/06* (2013.01); *B62D 11/001* (2013.01); *G05G 9/047* (2013.01); *G05G 2009/04774* (2013.01)

(58) Field of Classification Search
CPC ...... B62D 55/06; B62D 11/001; G05G 9/047; G05G 1/06; G05G 2009/04774;
(Continued)

(56) References Cited

U.S. PATENT DOCUMENTS 3,022,850 A * 2/1962 Bidwell .................. B62D 1/12 180/333
5,566,586 A * 10/1996 Lauer ..................... G05G 9/047 74/523
(Continued)

FOREIGN PATENT DOCUMENTS

CN 113513060 A 10/2021
DE 102007018246 A1 10/2008
(Continued)

OTHER PUBLICATIONS

European Search Report issued in corresponding European Application No. 23188598.9 with English translation of categories of cited documents, dated Feb. 6, 2024 (7 pages).
(Continued)

*Primary Examiner* — George C Jin
(74) *Attorney, Agent, or Firm* — FLYNN THIEL, P.C.

(57) ABSTRACT

A civilian tracked vehicle having a direction control device for manually controlling steering and travel direction functions of the tracked vehicle, and a control unit for controlling at least one operating function of the tracked vehicle. The direction control device and the control unit for the at least one operating function are integrated in a common operating device. The common operating device has an individual, manually actuable control column which can be displaced into a plurality of operating positions.

20 Claims, 2 Drawing Sheets

(58) Field of Classification Search
CPC ......... G05G 2009/04777; E02F 9/2004; E02F 9/20; E02F 3/842; B60P 1/045; F02F 9/075
See application file for complete search history.

(56) References Cited

U.S. PATENT DOCUMENTS

| | | | | |
|---|---|---|---|---|
| 6,354,023 | B1 * | 3/2002 | Trahan | G05G 9/047 37/234 |
| 6,460,639 | B1 * | 10/2002 | Hori | B62D 11/183 180/333 |
| 7,243,746 | B1 * | 7/2007 | Vasant | B62D 11/04 180/21 |
| 7,721,839 | B2 * | 5/2010 | Kim | B60N 2/79 180/326 |
| 7,854,291 | B2 | 12/2010 | Akahane et al. | |
| 8,028,599 | B2 | 10/2011 | Mack | |
| 8,887,597 | B2 * | 11/2014 | Black | G05G 9/047 74/471 XY |
| 11,573,591 | B2 | 2/2023 | Case et al. | |
| 2008/0128253 | A1 * | 6/2008 | Mack | G05G 1/01 200/52 R |
| 2009/0055058 | A1 * | 2/2009 | Morris | E02F 9/2004 701/50 |
| 2009/0198414 | A1 | 8/2009 | Mohning et al. | |
| 2012/0036956 | A1 | 2/2012 | Klein et al. | |

FOREIGN PATENT DOCUMENTS

| | | | | |
|---|---|---|---|---|
| DE | 06798140 | T1 | 12/2008 | |
| DE | 102009006371 | A1 | 6/2010 | |
| DE | 102010007608 | A1 | 8/2011 | |
| WO | WO-2021081655 | A1 * | 5/2021 | B60P 1/045 |

OTHER PUBLICATIONS

German Office Action issued in corresponding German Application No. 10 2022 208 965.0, mailed Mar. 29, 2023 (5 pages).

* cited by examiner

CIVILIAN TRACKED VEHICLE

CROSS-REFERENCE TO RELATED APPLICATION

This claims priority from German Application No. 10 2022 208 965.0, filed Aug. 30, 2022, the disclosure of which is hereby incorporated by reference in its entirety.

TECHNICAL FIELD

The invention relates to a civilian tracked vehicle having a carrier frame and a mounting frame arranged on the carrier frame. A tipping trough is mounted on the carrier frame and can be tilted about a tilting axis. The vehicle has a direction control device for manually controlling steering and travel direction functions of the tracked vehicle, and a control unit for controlling an operating function of the tracked vehicle which brings about tilting of the tipping trough.

BACKGROUND AND SUMMARY

Civilian tracked vehicles have been known for a considerable time. In this case, the direction control device generally comprises a steering wheel for manually controlling a steering function of the tracked vehicle. The direction control device typically comprises an additional selection lever, by means of which the travel direction function of the tracked vehicle can be actuated. The steering wheel is constructed separately from the selection lever. Furthermore, in conventional tracked vehicles, a control unit which is separate from the direction control device is provided for at least one operating function of the tracked vehicle. Conventional tracked vehicles of the type mentioned in the introduction require a multi-handed operation of the functions thereof, which requires particular concentration from the driver as a result of the consequent challenges in terms of coordination. Particularly when the driver is distracted or tired, operating errors can therefore quickly arise.

One aspect of the invention is to provide a civilian tracked vehicle which has improved properties over conventional tracked vehicles and which particularly allows a more fail-safe operation of steering, travel direction and at least one operating function of the tracked vehicle.

This is achieved in that the direction control device and the control unit for the at least one operating function are integrated in a common operating device which has an individual, manually actuable control column which can be displaced into a plurality of operating positions. The control column is also referred to as a joystick. The solution according to the invention makes it possible for the direction control device and the control unit to be operated by the driver using only one hand. This allows a particularly comfortable control of the steering and travel direction functions and of at least one operating function of the civilian tracked vehicle. Furthermore, the challenges in terms of coordination arising in conventional civilian tracked vehicles from the multi-handed operation of the functions thereof can be minimized or even eliminated. The civilian tracked vehicle according to the invention is therefore found to be particularly reliable with respect to operating errors caused by inadequate concentration, and can be controlled even by inexperienced drivers.

The operating function may be tilting and/or rotating a structure of the civilian tracked vehicle. The actuation of a cable winch of the tracked vehicle may also be such an operating function. It is possible to determine and change a travel direction of the tracked vehicle by means of the travel direction function. The travel direction function therefore allows a track chassis of the tracked vehicle to be driven either for forward or for backward travel and to be switched between the corresponding drive states. In other words: the travel direction function comprises a forward and a reverse gear of the tracked vehicle. The travel direction function can further comprise a neutral mode, in which with the drive unit being active a drive connection with respect to the track chassis is interrupted. The neutral mode can correspond to idle running. The steering function allows rotational movement of the tracked vehicle about the vertical axis thereof, in order thus to turn the tracked vehicle on the spot or—with simultaneous actuation of the travel direction function—to control it round a bend during forward or backward travel. In this instance, opposite track running gears are driven at different speeds and/or in opposition to each other.

Advantageously, the civilian tracked vehicle is a construction site vehicle. The civilian tracked vehicle can preferably be used as a working vehicle, in particular on a construction site, thus for constructing and maintaining pipelines, electricity lines and telephone lines, and for similar purposes.

In one embodiment of the invention, the mounting frame is arranged rotatably relative to the carrier frame about a rotation axis which extends in a vertical direction of the tracked vehicle. The rotation of the mounting frame forms an additional operating function of the tracked vehicle which can be operated by the control column or by a separate, manually actuable control member.

In another embodiment of the invention, the control column is constructed in a pivotably movable manner about a first pivot axis relative to a base unit of the operating device in order to control the steering function. The first pivot axis preferably extends in a longitudinal vehicle direction of the tracked vehicle. Accordingly, the control column can be pivoted to the left, when viewed in the longitudinal vehicle direction, in order to turn the tracked vehicle to the left. Conversely, the control column can be pivoted to the right in order to turn the tracked vehicle to the right. This affords a particularly intuitive possibility of manually controlling the steering function.

In another embodiment of the invention, the control column is constructed in a pivotably movable manner relative to the base unit about a second pivot axis which is positioned in particular at an angle relative to the first pivot axis in order to control an acceleration and/or braking function of the civilian tracked vehicle. Alternatively or additionally, at least one pedal of the civilian tracked vehicle can be provided in order to control the acceleration and/or braking function, in particular in each case. The second pivot axis can extend in a width direction of the civilian tracked vehicle so that the acceleration and/or braking function of the civilian tracked vehicle can be controlled by the control column being pivoted forward and/or backward, when viewed in the longitudinal vehicle direction. Therefore, the control column can be moved in the direction in which an acceleration and/or deceleration which acts on the tracked vehicle is intended to be directed.

In another embodiment of the invention, the direction control device has a first actuation element which is arranged on the control column, in particular a toggle switch and/or button, in order to control the travel direction function. This allows a particularly rapid actuation of the travel direction function by the driver when the driver grasps the control column with one hand. In particular, the first actuation element is arranged in such a manner that it can be actuated by a thumb of the driver when the driver grasps the control column.

In another embodiment of the invention, the control unit has, per operating function, a second actuation element which is arranged on the control column, in particular a rocker switch and/or button, in order to control the respective operating function. The driver can consequently actuate the operating function with the same hand with which the driver also manually controls the steering function and the travel direction function. Error-prone and time-consuming grasping in order to control the individual functions is unnecessary. The second actuation element may be adjustable between a first control position and a second control position. If the relevant operating function has two counteracting portions, both of said portions can therefore be controlled by means of the second actuation element. Such counteracting portions may, for example, involve winding up and unwinding a cable winch of the tracked vehicle. Tilting the structure of the tracked vehicle up and down may also constitute such counteracting portions. The same applies to rotation of the structure clockwise and anticlockwise.

In another embodiment of the invention, the control unit has at least one third actuation element which is arranged on the control column, in particular buttons, in order to activate or deactivate, in particular block, at least one operating function. It will be understood that by means of the third actuation element the at least one operating function can be activated, in particular unblocked, if it is previously in a deactivated or blocked state. This helps to counteract an inadvertent actuation of the at least one operating function. It is conceivable to displace the operating function automatically by an automatic control unit into the blocked state if an operating parameter of the tracked vehicle exceeds a predetermined threshold value. Such an operating parameter may be, for example, a slip detection or an underlying ground inclination transmitted to the tracked vehicle.

In another embodiment of the invention, a fourth actuation element, in particular a button, is arranged on the control column in order to actuate an acoustic function of the tracked vehicle. The acoustic function may be a warning signal, in particular a horn, of the tracked vehicle. Advantageously, another function of the tracked vehicle can consequently be controlled manually by means of the control column.

Advantageously, the control column is connected at one end to the base unit an articulated manner, with a gripping portion for manually actuating the control column being arranged at the other end. This allows a particularly ergonomic manual control of the functions of the tracked vehicle.

Advantageously, the steering function, the travel direction function and the at least one operating function can be controlled exclusively by means of the operating device or unit, in particular by means of the control column. This saves structural space.

In another embodiment of the invention, the operating device is arranged on a vehicle seat of the tracked vehicle, in particular on an armrest of the driver's seat. Advantageously, consequently, an adjustment or rotation of the driver's seat is also transmitted directly to the operating device. A complex relative positioning of the operating device relative to the driver's seat is not necessary in this case. The adjustment of the driver's seat can be carried out along the vertical axis of the tracked vehicle and/or in the longitudinal vehicle direction and/or in a transverse vehicle direction.

In another embodiment of the invention, a driver's cab is arranged on the mounting frame. Preferably, the driver's cab is arranged in a manner offset relative to the tipping trough on the mounting frame.

In another embodiment of the invention, there is provided a mounting frame which is arranged on a carrier frame of the tracked vehicle and on which a structure can be mounted, which structure can be tilted about at least one tilting axis relative to the carrier frame by actuating at least one of the operating functions. The structure may be a tipping trough. Such a tiltable structure allows particularly rapid unloading of a load transported by the structure. In an alternative embodiment, a structure which is rigid relative to the carrier frame may be able to be mounted on the mounting frame.

In another embodiment of the invention, the mounting frame is rotatable relative to the carrier frame about a rotation axis, which extends transversely relative to the tilting axis, in particular in a vertical direction of the tracked vehicle, by means of a further operating function of the tracked vehicle. Consequently, a location for unloading the load can be set precisely around the tracked vehicle without requiring the civilian tracked vehicle to be moved. The vertical axis of the tracked vehicle can extend in the vertical direction.

In another embodiment of the invention, a driver's cab is arranged on the carrier frame or on the mounting frame, in particular in a manner offset relative to the structure. The operating device is preferably provided in an internal space of the driver's cab. If the driver's cab is arranged on the carrier frame, the mounting frame can be tilted relative to the driver's cab and optionally rotated. If the driver's cab is arranged on the mounting frame, the mounting frame can be rotated together with the driver's cab relative to the carrier frame.

Advantageously, at least two, in particular all, of the functions which can be controlled by means of the operating device can be controlled simultaneously. This saves time when using the tracked vehicle, in particular on a construction site.

Additional advantages and features of the invention will be apparent from the claims and the following description of a preferred exemplary embodiment of the invention which is illustrated with reference to the drawings.

It will be understood that the above-mentioned features and those still to be explained below can be used not only in the combination indicated in each case, but also in other combinations or by themselves without departing from the scope of the present invention.

DETAILED DESCRIPTION

Figure 1:
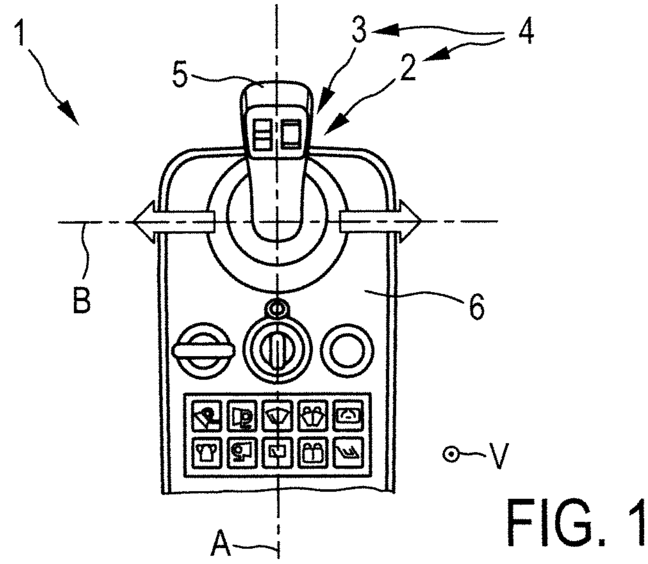
FIG. 1 shows a plan view of an operating device of an embodiment of a civilian tracked vehicle according to the invention.
Figure 2:
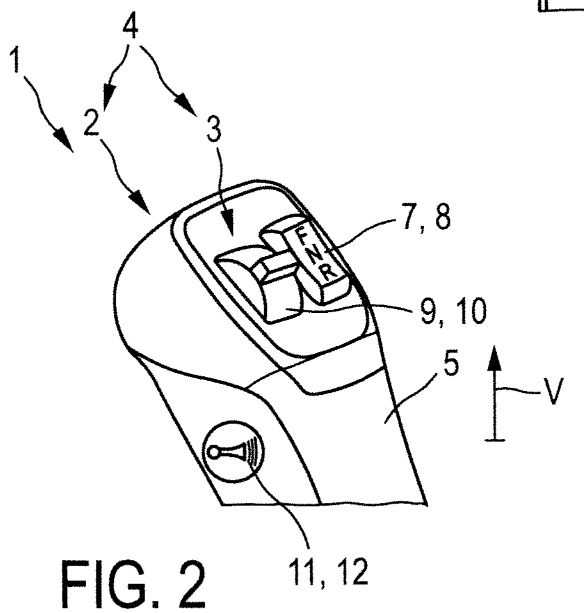
FIG. 2 shows a perspective view of a detail of the operating device of the civilian tracked vehicle according to FIG. 1.
Figure 3:
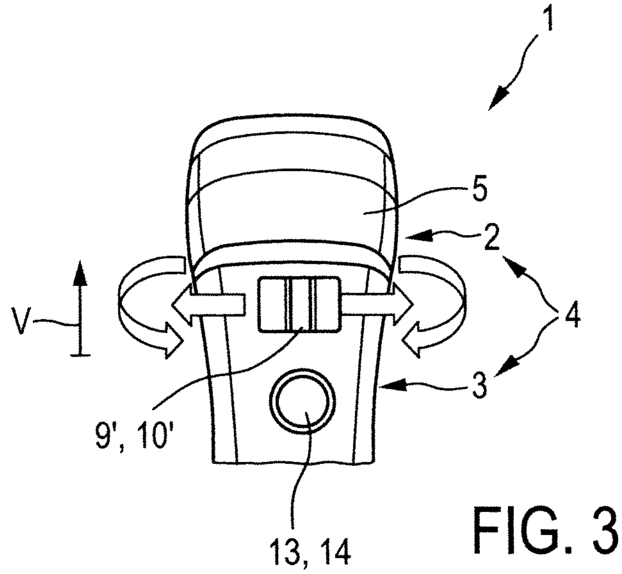
FIG. 3 shows a front view of a detail of the operating device of the civilian tracked vehicle according to FIGS. 1 and 2.
Figure 4:
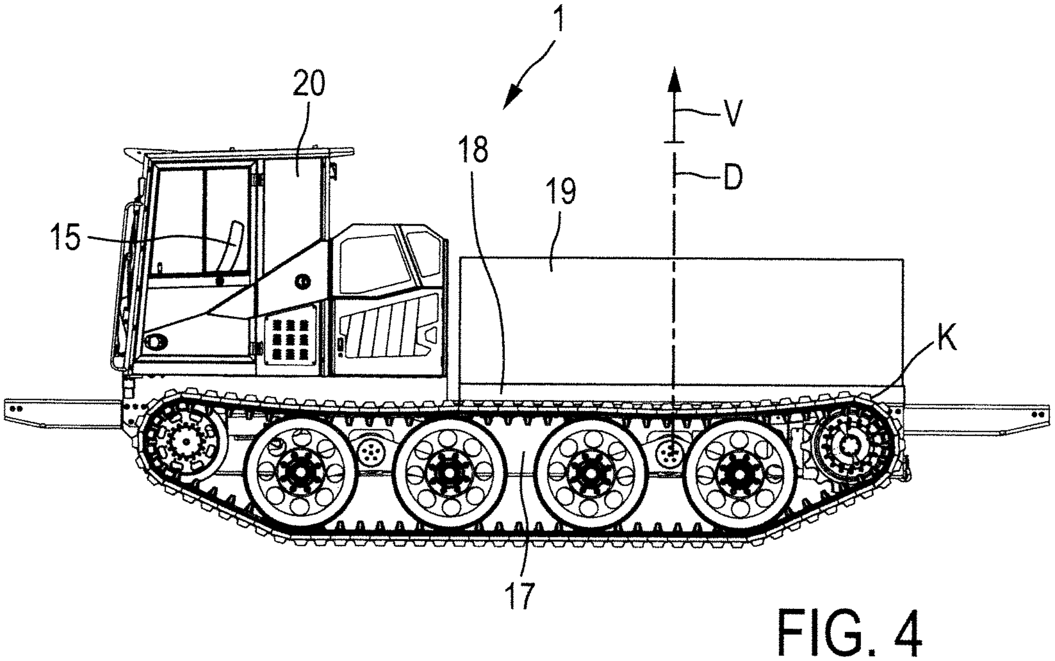
FIG. 4 shows a side view of the civilian tracked vehicle according to FIGS. 1 to 3.
Figure 5:
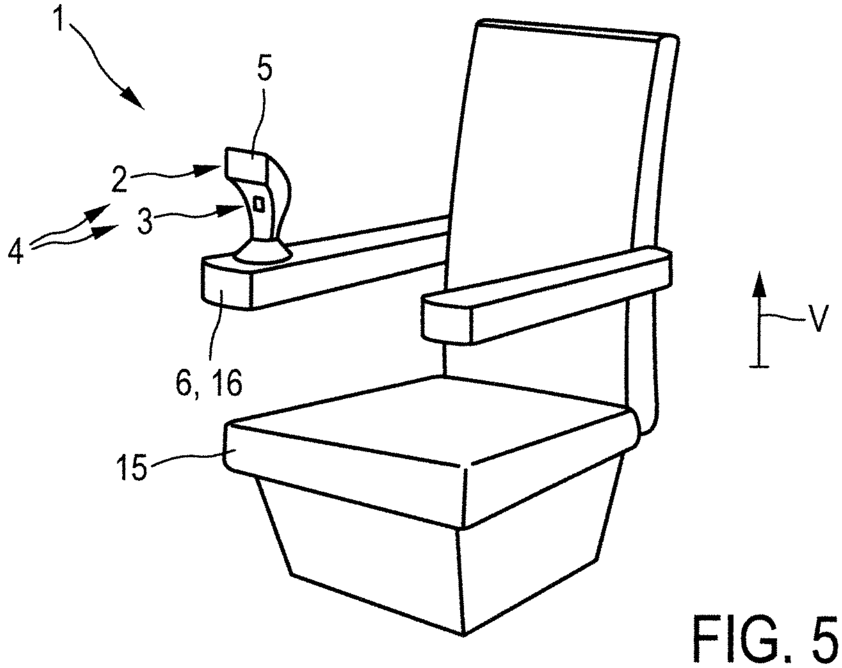
FIG. 5 shows a perspective view of a driver's seat of the civilian tracked vehicle according to FIGS. 1 to 4.

A civilian tracked vehicle 1 can be configured for use on a construction site. Accordingly, the civilian tracked vehicle 1 may be a construction site vehicle. The civilian tracked vehicle 1 can preferably be used as a working vehicle, thus for constructing and maintaining pipelines, electricity lines and telephone lines, and for similar purposes.

The civilian tracked vehicle 1 has a direction control device 2. The direction control device 2 serves to manually control steering and travel direction functions of the tracked vehicle 1. The tracked vehicle 1 has in this instance a track chassis with two mutually opposite track running gears. In order to steer the tracked vehicle 1, the two track running gears thereof can be driven at different rotating speeds. The track running gears can be driven in the same direction or in opposite directions, in two mutually opposed rotational directions. Consequently, the tracked vehicle 1 can turn on the spot or travel forward or backward. The function of the forward or backward travel and the steering or turning of the tracked vehicle corresponds to the travel direction function. In other words: by means of the direction control device 2, on the one hand, the tracked vehicle 1 can be steered and, on the other hand, it can be determined whether the tracked vehicle 1 travels forward or backward.

The civilian tracked vehicle 1 further comprises a control unit 3 for at least one operating function of the tracked vehicle 1. The operating function of the tracked vehicle 1 may be a rotation or tilting of a structure 19 of the tracked vehicle 1. Alternatively or additionally, there may be provided an operating function, according to which a cable winch of the tracked vehicle 1 is controlled. The direction control device 2 and the control unit 3 for the at least one operating function are integrated in a common operating device 4. The operating device 4 has a single control column 5. The control column 5 can be manually actuated. The control column 5 can be displaced into a plurality of operating positions.

In this instance, the operating device 4 comprises a base unit 6. In this case, the control column 5 is constructed in a pivotably movable manner about a first pivot axis A relative to the base unit 6. The steering function is controlled by pivoting the control column 5 about the first pivot axis A. In order to accelerate and/or decelerate the civilian tracked vehicle 1, an acceleration and/or braking function can be provided. The acceleration function and/or the braking function can be controlled by means of at least one pedal. One pedal may be provided for the braking function and one pedal for the acceleration function.

Alternatively or additionally to the at least one pedal, the control column 5 may be constructed in a pivotably movable manner about a second pivot axis B relative to the base unit 6 in order to control the acceleration function and/or braking function. The second pivot axis B can be positioned at an angle relative to the first pivot axis A. In this instance, the second pivot axis B extends in a longitudinal vehicle direction of the civilian tracked vehicle 1. In this case, the first pivot axis A extends in a transverse vehicle direction which extends perpendicularly to the longitudinal vehicle direction and perpendicularly to a vertical axis of the tracked vehicle 1.

In the embodiment shown, the direction control device 2 has a first actuation element 7. The first actuation element 7 is arranged on the control column 5. The first actuation element 7 is in the form of a toggle switch 8 in this case. The first actuation element 7 may be in the form of a button. The travel direction function can be controlled by means of the first actuation element 7. The toggle switch 8 can be adjusted between at least two control positions. In a first of the control positions, the travel direction function may allow forward travel of the tracked vehicle 1. In the second control position, the travel direction function may allow backward travel of the tracked vehicle 1. Furthermore, a third control position of the toggle switch 8, in which the travel direction function is neutral, may be provided. In the third control position, no drive of the track chassis of the tracked vehicle 1 is carried out. In the third control position, a neutral mode of the travel direction function may be active.

In this instance, the control unit 3 comprises, per operating function, a second actuation element 9, 9'. In this case, the tracked vehicle 1 has two operating functions. Accordingly, two second actuation elements 9, 9' are arranged on the control column 5. The second actuation element 9, 9' is, for example, in the form of a rocker switch 10, 10'. The second actuation element 9, 9' may be in the form of a button. The second actuation element 9, 9' is used to control the respective operating function. The rocker switch 10, 10' is displaceably movable between two control positions. In this case, the rocker switch 10, 10' is automatically adjusted back into a neutral central position which is located between the two control positions thereof. In the neutral control position of the respective rocker switch 10, 10', the relevant operating function is not actuated. In the two control positions of the rocker switch 10, 10', counteracting portions of the relevant operating function can be controlled. Rocker axes of the rocker switches 10, 10' can be positioned at an angle relative to each other.

In this case, the control unit 3 further has a third actuation element 13 which is arranged on the control column 5. The third actuation element 13 is, for example, in the form of a button 14. The third actuation element 13 is used to activate or deactivate at least one operating function. In this case, both operating functions of the tracked vehicle 1 can be activated or deactivated by means of the third actuation element 13. In particular, the operating functions can be blocked by means of the third actuation element 13. If the operating functions are deactivated or blocked, they cannot be controlled by means of the second actuation element 9, 9'. The deactivation or blocking of the operating function can be cancelled by means of the third actuation element 13.

In this case, a fourth actuation element 11 is further arranged on the control column 5. The fourth actuation element 11 may be in the form of a button 12. The fourth actuation element 11 is used to actuate an acoustic function of the tracked vehicle 1. For example, by means of the actuation element 11 an acoustic warning signal of the tracked vehicle 1 can be controlled. A horn of the tracked vehicle 1 can be actuated by means of the actuation element 11.

In this case, the control column 5 is connected at one end to the base unit 6 in an articulated manner. At the other end, the control column 5 has a gripping portion for the manual actuation thereof. The two second actuation elements 9, 9' can be arranged at mutually opposite sides of the control column 5. The actuation elements 7, 9 and 11 can be arranged on the control column 5 in such a manner that they can be actuated by means of a thumb of the driver if the driver grasps the control column 5 at the gripping portion. The actuation elements 9', 13' can be arranged on the control column 5 in such a manner that they can be actuated by means of an index finger and/or a middle finger of the driver when the driver grasps the control column 5 at the gripping portion.

In the civilian tracked vehicle 1 shown, the operating device 4 is arranged on a driver's seat 15 of the tracked vehicle 1. For example, the operating device 4 is arranged on an armrest 16 of the driver's seat 15. In this case, the base unit 6 of the operating device 4 is integrated in the armrest 16. The driver's seat 15 can be constructed in a vertically and/or laterally and/or rotationally adjustable manner. During adjustment or rotation of the driver's seat 15, the operating device 4 retains its position relative to the driver's seat 15. Therefore, the driver's seat 15 is then adjusted or rotated together with the operating device 4. In an alternative embodiment, which is not shown in the figures, of the civilian tracked vehicle 1 according to the invention, the operating device 4 can be arranged remote from the driver's seat 15, for example, on an instrument panel, on a central or lateral console.

In this case, the tracked vehicle 1 has a carrier frame 17. A mounting frame 18 is arranged on the carrier frame 17. A structure 19 can be mounted on the mounting frame 18. The structure 19 can be tilted about a tilting axis K relative to the carrier frame 17 by means of one of the operating functions of the tracked vehicle 1. Tilting upward and downward may constitute counteracting portions of the tilting operating function. The structure 19 may be a tipping trough. The mounting frame 18 can be rotated relative to the carrier frame 17 about a rotation axis D, which extends transversely relative to the tilting axis K, by means of the additional operating function of the tracked vehicle 1. A rotation of the mounting frame 18 in and counter to the clockwise direction may constitute counteracting portions of the rotational operating function. In this case, the rotation axis D extends in a vertical direction V of the tracked vehicle 1. The rocker axis of the rocker switch 10 can extend parallel to the tilting axis K. The rocker axis of the rocker switch 10' can extend parallel to the rotation axis D.

In this case, the civilian tracked vehicle 1 is further provided with a driver's cab 20. In the embodiment shown, the driver's cab 20 is arranged on the carrier frame. Alternatively, the driver's cab 20 may be arranged on the mounting frame 18. The driver's cab 20 can be arranged in a manner offset relative to the structure 19 on the mounting frame 18. In this case, the structure 19 can be rotated and tilted relative to the carrier frame 17 and relative to the driver's cab 20. If the driver's cab 20 is arranged on the mounting frame 18, the mounting frame 18 can be rotated together with the driver's cab 20 relative to the carrier frame 17. In this case, the structure 19 can be tilted relative to the mounting frame 18 and relative to the driver's cab 20 in each rotational position of the mounting frame 18.

The invention claimed is:

1. A civilian tracked vehicle, comprising:

a carrier frame;

a mounting frame arranged on the carrier frame;

a tipping trough mounted on the mounting frame and tiltable about a tilting axis;

a direction control device configured for manually controlling a steering and a forward and reverse travel direction function of the tracked vehicle; and a control unit configured for controlling at least one operating function of the tracked vehicle which brings about tilting of the tipping trough, wherein the direction control device and the control unit for controlling the at least one operating function are integrated in a common operating device, the common operating device having an individual, manually actuable control column displaceable into a plurality of operating positions, the direction control device comprising an actuation element mounted on the control column so as to be accessible by a user, the actuation element being configured for manipulation by the user to control the forward and reverse travel direction function.

2. The civilian tracked vehicle according to claim 1, wherein the mounting frame is arranged rotatably relative to the carrier frame about a rotation axis extending in a vertical direction of the tracked vehicle.

3. The civilian tracked vehicle according to claim 1, wherein the common operating device has a base unit and the control column is constructed in a pivotably movable manner for pivoting about a first pivot axis relative to the base unit of the common operating device in order to control the steering function of the tracked vehicle.

4. The civilian tracked vehicle according to claim 3, wherein the control column is constructed in a pivotably movable manner relative to the base unit about a second pivot axis positioned at an angle relative to the first pivot axis in order to control an acceleration and/or braking function of the civilian tracked vehicle.

5. The civilian tracked vehicle according to claim 1, wherein the actuation element is a first actuation element, and the control unit has, for each operating function, a second actuation element mounted on the control column so as to be accessible by the user, the second actuation element being configured for manipulation by the user to control a respective operating function of the tracked vehicle.

6. The civilian tracked vehicle according to claim 5, wherein the control unit has at least one third actuation element mounted on the control column so as to be accessible by the user, the at least one third actuation element being configured for manipulation by the user to activate or deactivate at least one operating function of the tracked vehicle.

7. The civilian tracked vehicle according to claim 6, wherein the control unit has a fourth actuation element mounted on the control column so as to be accessible by the user, the fourth actuation element being configured to actuate an acoustic function of the tracked vehicle.

8. The civilian tracked vehicle according to claim 1, further including a driver's seat and the common operating device is arranged on the driver's seat.

9. The civilian tracked vehicle according to claim 1, further including a driver's cab arranged on the mounting frame.

10. The civilian tracked vehicle according to claim 9, wherein the driver's cab is arranged on the mounting frame offset relative to the tipping trough.

11. The civilian tracked vehicle according to claim 1, wherein the actuation element comprises a toggle switch or a button.

12. The civilian tracked vehicle according to claim 5, wherein the second actuation element comprises a rocker switch or a button.

13. The civilian tracked vehicle according to claim 6, wherein the at least one third actuation element comprises buttons.

14. The civilian tracked vehicle according to claim 6, wherein the at least one third actuation element is configured to block at least one operating function of the tracked vehicle.

15. The civilian tracked vehicle according to claim 7, wherein the fourth actuation element comprises a button.

16. The civilian tracked vehicle according to claim 8, wherein the driver's seat includes an armrest and the common operating device is arranged on the armrest.

17. The civilian tracked vehicle according to claim 1, wherein the actuation element is disposed on a portion of the control column directly accessible by a user.

18. A civilian tracked vehicle, comprising:

a carrier frame;

a mounting frame disposed on the carrier frame;

a structure mounted on the mounting frame for movement relative to the carrier frame about a pivot axis; and a common control device including a control column configured for manual displacement into a plurality of operating positions, the control column comprising:

a direction control device integrated into the control column and configured for manually controlling a steering function and a forward and reverse travel direction function of the tracked vehicle, the direction control device comprising an actuation element mounted on the control column so as to be accessible by a user, the actuation element being configured for manipulation by the user for controlling the forward and reverse travel direction function; and a control unit integrated into the control column and configured to control at least one operating function of the structure mounted on the mounting frame, the at least one operating function at least including movement of the structure about the pivot axis.

19. The civilian tracked vehicle according to claim 18, wherein the structure comprises a trough.

20. The civilian tracked vehicle according to claim 18, wherein the actuation element is disposed on a portion of the control column directly accessible by a user.

* * * * *